United States Patent [19]
Hubbard et al.

[11] 3,765,526
[45] Oct. 16, 1973

[54] HARVESTER
[75] Inventors: Arthur Lowell Hubbard, Des Moines; Russell Dean Copley, Ankeny; Thomas Heral Gannon, Dallas Center, all of Iowa
[73] Assignee: Deere & Company, Moline, Ill.
[22] Filed: Mar. 11, 1971
[21] Appl. No.: 123,250

[52] U.S. Cl. ................................................. 198/217
[51] Int. Cl. ............................................. B65g 33/00
[58] Field of Search.................... 198/208, 9, 217; 56/1 C

[56] References Cited
UNITED STATES PATENTS

| | | | |
|---|---|---|---|
| 2,413,265 | 12/1946 | Thompson | 198/208 |
| 2,893,537 | 7/1959 | Krahn | 198/217 |
| 3,402,533 | 9/1968 | Johnson | 56/1 C |
| 1,913,040 | 6/1933 | Pierson | 198/208 |
| 3,339,352 | 9/1967 | Burrough | 56/1 C |

*Primary Examiner*—Richard E. Aegerter
*Attorney*—H. Vincent Harsha, Harold M. Knoth, William A. Murray, John M. Nolan and Raymond L. Hollister

[57] ABSTRACT

In a cotton harvester in which the harvesting units feed cotton to a rear transverse auger, the improvement residing in mechanism for holding down and releasing the auger from its auger housing so as to permit cleanout of the auger upon it becoming clogged or upon it receiving a foreign object which cannot pass through the auger structure.

12 Claims, 7 Drawing Figures

INVENTORS
A. L. HUBBARD
R. D. COPLEY
T. H. GANNON
BY William A. Murray
ATTORNEY

FIG. 3
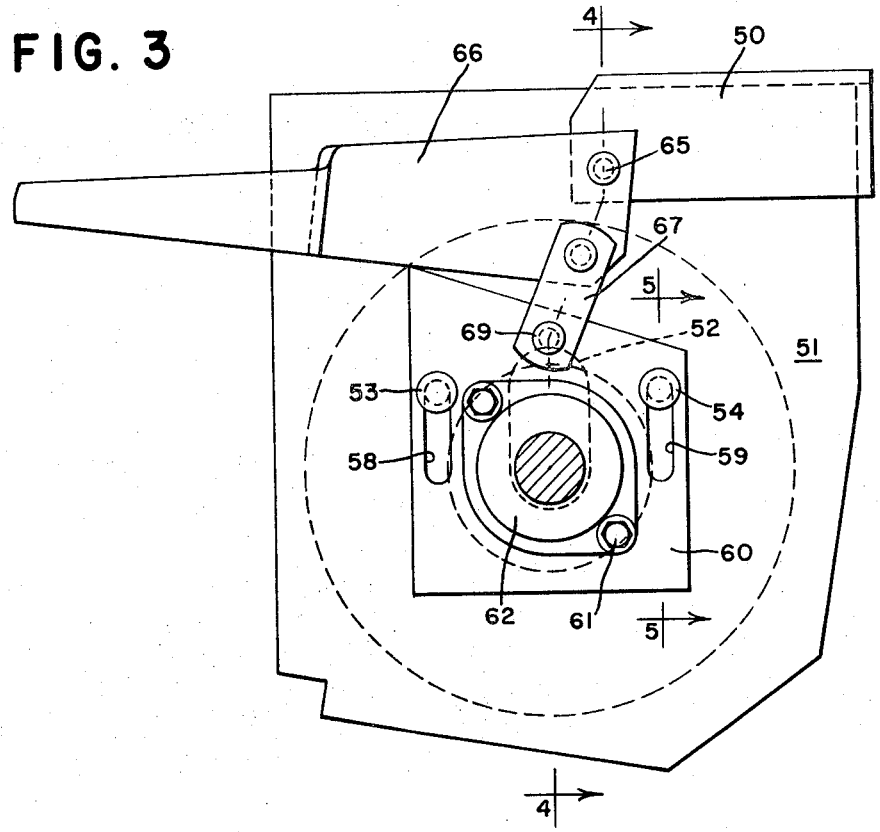
FIG. 4
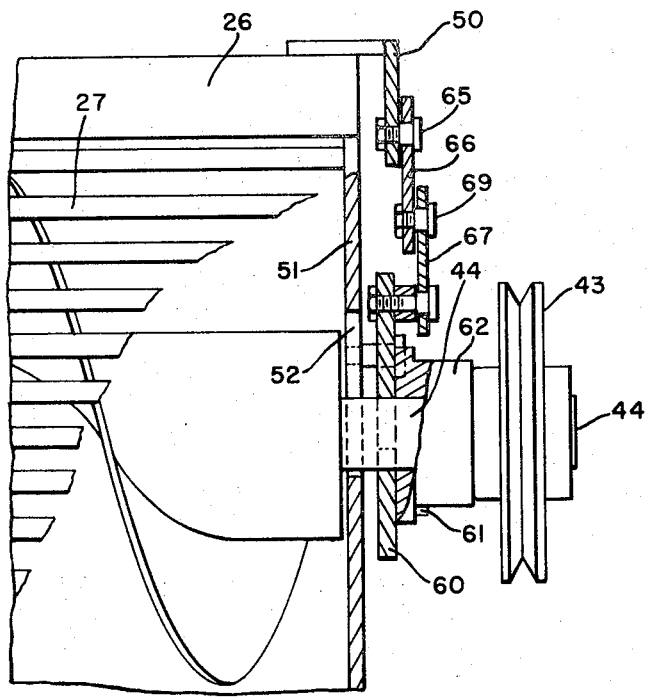
FIG. 5
INVENTORS
A. L. HUBBARD
R. D. COPLEY
T. H. GANNON
BY William A. Murray
ATTORNEY

HARVESTER

BACKGROUND OF THE INVENTION

It has heretofore been known to provide a cotton harvester of the type in which cotton is stripped from the plants by two forwardly positioned harvesting units and is moved rearwardly to a transverse auger which catches the stripped cotton. The auger moves the cotton inwardly to a paddle structure which throws it into an air conveyor system that elevates it to a container. In such a cotton harvester, there is often created a problem in the transfer of cotton by the transverse auger. Cotton, by its nature, adheres to cotton and consequently the cotton bolls when harvested often cling to one another and create clogged conditions when they are held in restricted areas. Also, the type of cotton harvester referred to often will pick up foreign objects such as sticks, small logs or stones which are also moved rearwardly to the transverse auger. These objects can also create clogged conditions in the transverse auger. When an auger is clogged, it becomes extremely difficult to remove the clogged material from it and often there is a tendency for an operator to operate the auger at the same time there is an attempt to remove the material. This, of course, creates an unsafe condition.

SUMMARY OF THE INVENTION

With the above in mind, it is the primary object of the present invention to provide a cotton stripper which moves cotton rearwardly in a conventional manner to a transverse auger which feeds the cotton centrally behind a tractor where it is dispatched by paddle means into an air conveying mechanism which then moves the cotton to an awaiting container. The auger is supported in its housing structure by a pair of journals at opposite ends of the augers that are free to move vertically with respect to the housing. Levers are provided at opposite ends of the auger to move vertically and the levers operate control elements that are shiftable with the lever and are operatively connected to the journal supports so as to hold the journal supports in a position in which the auger is seated in the base of the housing.

In one form of the invention, it is a primary object to provide a linkage between the lever and the respective journal support that moves into an over-center locking position when the auger is seated. In a second form of the invention, it is the primary object to provide a cam that moves or shifts with the lever and which engages a portion of the journal support so as to hold the auger in its seated position with respect to its housing.

BRIEF DESCRIPTION OF THE DRAWINGS

FIG. 3 is an enlarged end view of one end of the cross auger structure as taken from the side of the implement.

FIG. 4 is a sectional view taken substantially along the line 4—4 of FIG. 3.

FIG. 5 is a sectional view taken substantially along line 5—5 of FIG. 3

DESCRIPTION OF THE PREFERRED EMBODIMENT

Figure 1:
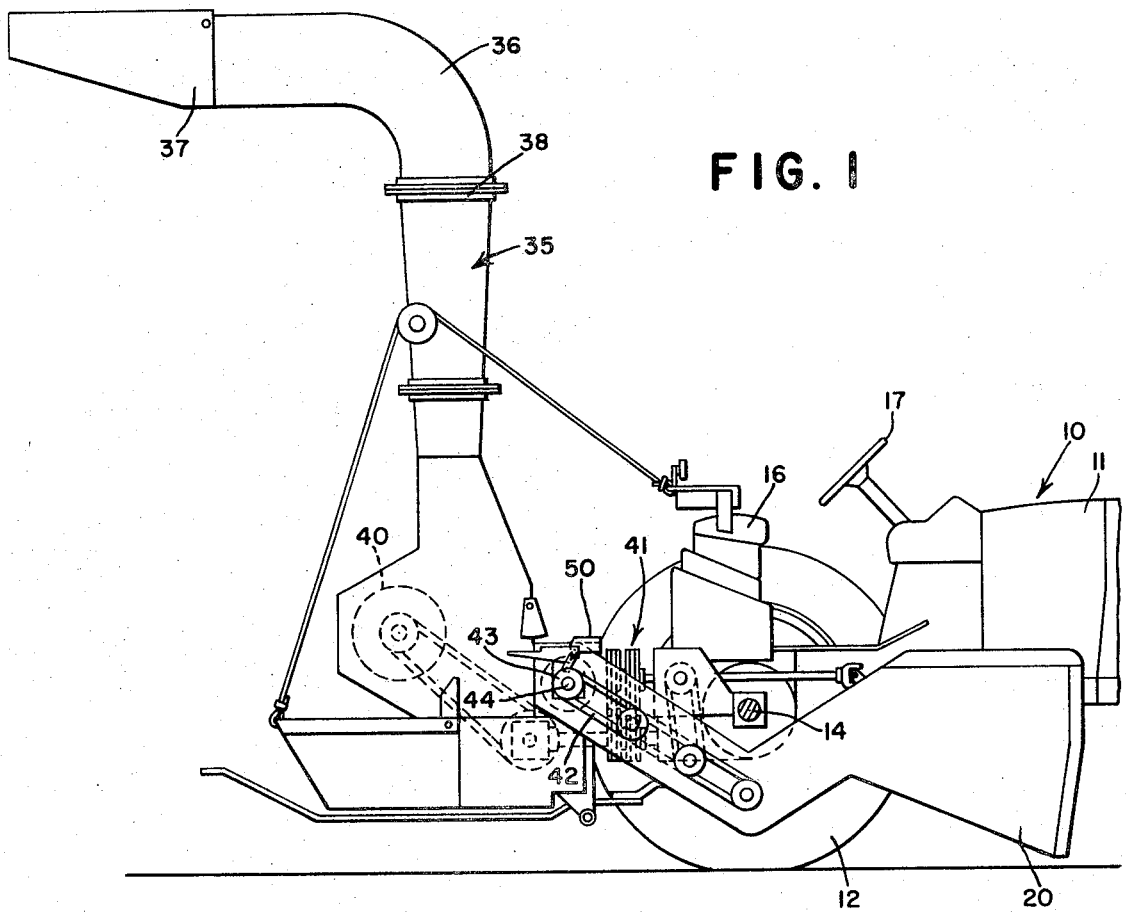
FIG. 1 is a side view of a cotton harvester incorporating the features of the present invention.
Figure 2:
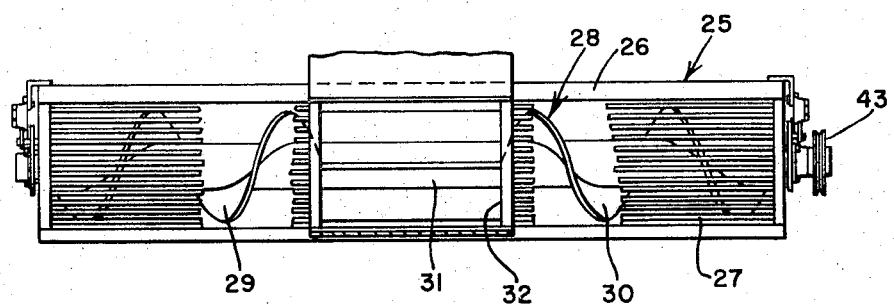
FIG. 2 is a section view taken substantially along the line 2—2 with portions of the auger housing removed to show internal mechanism.

The cotton harvester herein to be described is supported on a main support or tractor 10 having a fore-and-aft extending body 11 carried on rear traction wheels 12 on opposite ends of the transverse axle structure 14. The tractor body is supported at its forward end by front steerable wheels, not shown. An operator's station, as indicated by a seat 16 and steering wheel 17 is provided on the tractor body 11. The harvester is composed of a pair of row units 20 positioned on opposite sides of the tractor body 11 and forwardly of the axle structure 14. The units may be of any conventional nature. Generally the harvester is composed of a forward harvesting mechanism disposed forwardly of the traction wheels 12 that contacts the cotton plants and dislodges the cotton bolls from the plants. The cotton bolls are then transferred to a cleaning mechanism on the side of the harvesting mechanism and dispatched rearwardly by elevators 22 extending from lower intake ends beneath the axle structure 14 upwardly and rearwardly to a pair of transversely spaced discharge ends rearwardly of the traction wheels.

A transverse auger structure 25 extends between the discharge ends of the elevators 22 and includes an auger housing having a front and overhead closed portion 26 and a rear underlying grille portion 27, the latter forming with the housing portion 26 a transverse tube for receiving an auger device 28. The auger device 28 includes a pair of spiral helical flightings 29, 30 that feed material from the discharge ends of the elevators 22 to a central impeller portion 31. The impeller 31 is composed of a series of radial paddles that receive the cotton from the helical flightings 29, 30 and ride it rearwardly through a centrally located rear outlet 32.

Positioned rearwardly of the transverse auger structure 25 and directly in line with the outlet 32 is an upright cotton conveying mechanism including a vertical structure 35 having at its upper end an elbow 36 for directing material horizontally rearwardly through a discharge spout 37. A juncture 38 is provided between the elbow 36 and a lower upright portion 34 of the duct structure so that the elbow may be directed forwardly or rearwardly. This is to permit cotton to be discharged rearwardly as shown or forwardly into an awaiting basket carried in an overhead relation to the tractor 10, the latter not being shown. A blower, indicated in its location by the reference numeral 40 is provided at the base of the duct structure 35 and drives a stream of air upwardly through the duct. Cotton moving through the outlet 32 is entrained in a stream of air induced by the blower 40 and the lighter bolls are driven upwardly while the heavier bolls and trash are permitted to drop. A more detailed description of the blower 40, the method of separating the ripe from the green bolls, and the movement of the bolls through the duct structure 35 is better described in U. S. Pat. No. 3,397,522 which issued to L. F. Sanderson et al. on 20 Aug. 1968. Referring to FIG. 1, a drive mechanism indicated in its entirety by the reference numeral 41 extends from the tractor to drive the entire cotton harvester and with respect to the auger structure 25 terminates in a V-belt drive 42 that drives a pulley 43 carried on an auger shaft 44.

Reference is now made to FIGS. 3 and 4. The support structure for the auger 28, which includes in part a housing 26, 27, has fixed thereto at each end of the housing an upright bracket support 50. The housing for the aguer 25 includes end plates, one of which is shown at 51, which has an elongated upright slot 52. The auger shaft 44 extends through the respective end plates 51 so that the auger is free to move, unless restricted, vertically from its lower position at the base of the auger housing. Each end plate 51 has threaded openings and a pair of guide members or pins 53, 54 have threaded inner ends 55, that are received in tapped openings in the end wall or plate 51. The pins 53, 54 also have large head ends 56 and a reduced central section 57. The pins 53, 54 are received in vertically extending slots 58, 59 that are parallel to one another and are cut in a journaled support plate 60. The head ends 56 fit outwardly of the plates 60 and restrict the respective support plates 60 against axial movement with respect to the shaft 44. The internal support plates 60 have bolted at 61 thereto a journaled box 62 which carries the auger shaft 44. As shown in FIG. 4, the shaft 44 extends outwardly of the journal box 62 and carries the pulley 43. As would be obvious, the opposite end of the shaft 44 does not have a pulley 43 since the pulley 43 is utilized to drive the shaft and only one pulley is thereby required.

The pins 54 and their respective reduced portions 57 are longer than the thickness of the plate 60 and consequently the plate 60, the journal box 62 and the shaft 44 and its auger 28 are free to move, unless restricted, vertically from the base of the auger housing. Pivotally mounted at 65 to the support brackets 50 are lever arms 66. A link 67 extends downwardly from a forward end of the lever 66, where it is pivotally connected at 68, to the plate 60 where it is pivotally connected at 69. When the plate 60 is in its lowermost position, which occurs when the pins 53, 54 are at the top of the slots 58, 59 and the auger is properly seated in the base of its housing structure, the pivots 65, 68 and 69 are positioned so as to provide an over-center locking mechanism for the lever 66. When in such a locking position, the plate 60 is held in its lowermost position. Thus, when the lever 66 is moved to its lowermost position, as shown in FIG. 3, the arm 66 and link 67 operate as hold-down means to restrict movement of the auger structure 55 from its lowermost or seated position with respect to the housing structure 26, 27. In this respect, the auger structure 25 is normally held in the base of the housing which is the best position for proper conveying of material.

In operation the auger structure 25 is normally held in the base of the housing by positioning the levers 66 so that the linkage 67 and its respective pivots are in an over-center locking position as shown in FIG. 3. Should the auger become clogged with cotton or become blocked by a foreign object, the levers 66 may be raised to utilize the link 67 to lift the plate support 60 and its respective journal support 62. This lifts one end of the auger. One or both ends of the augers may be raised depending upon the degree of clogging. Once the auger structure 25 is raised, it becomes rather simple to remove the clogged material from the auger.

Figure 6:
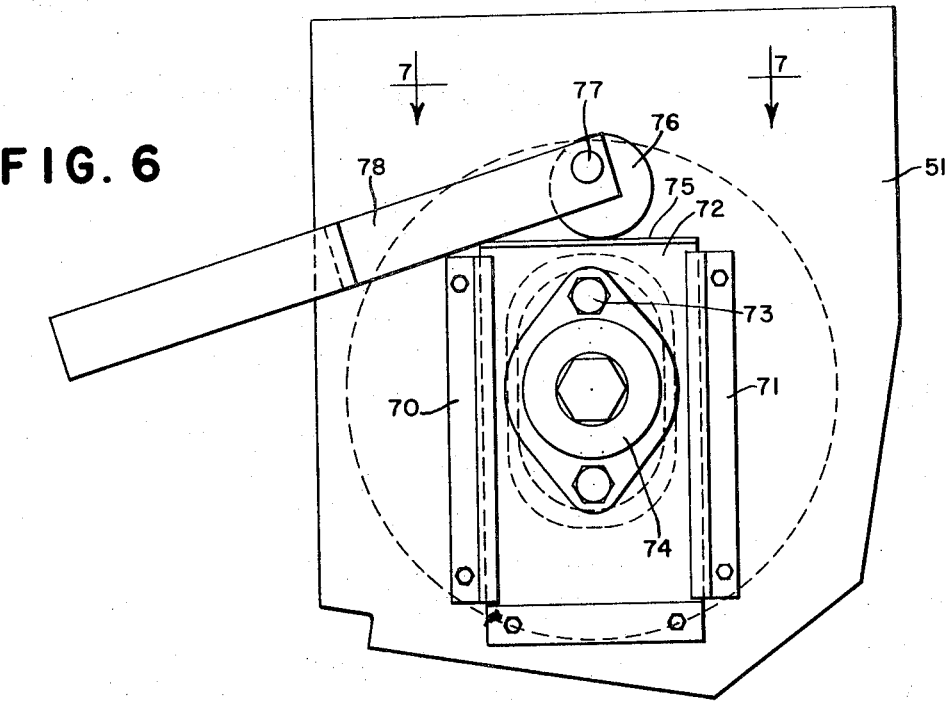
FIG. 6 is a view similar to FIG. 3 but showing a modified form of the invention.
Figure 7:
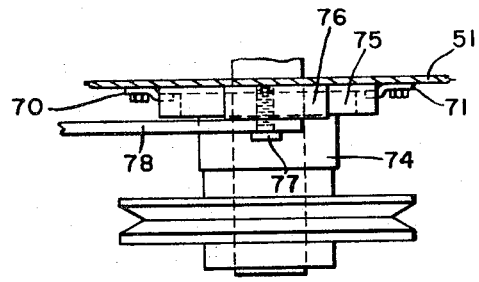
FIG. 7 is a sectional view taken substantially along the line 7—7 of FIG. 6.

In the modified form of the invention, as shown in FIGS. 6 and 7, there is provided on the auger housing end plate 51 a pair of vertical guides or tracks 70, 71 with lips that overlie the edges of a vertically movable journal support plate 72. The plate 72 has bolted at 73 thereto a journal support 74 which carries the end of the auger shaft 44. The upper edge of the plate 72 has an outwardly extending flange 75 that lies adjacent the underside of a cam 76. The cam is a circular member mounted eccentrically on the wall 51 by a pin 77. The pin 77 is rockable on the end wall 51 and also has rigidly mounted thereon a lever arm 78.

When it is desired to hold the auger structure 25 in a down position, as shown in FIG. 5, the lever 78 is rotated so that the cam 76 drives or holds the plate 72 in its down position. This causes the auger structure 25 to reside in the base of the housing structure. Upon the auger becoming clogged or upon a foreign object becoming caught in the auger structure, the lever 78 may be raised which causes the cam 76 to disengage the flange 75. At this time, the end of the auger structure 25 on which the cam has become disengaged may be raised and the material removed from under it.

We claim

1. In a cotton harvester having cotton harvesting mechanism feeding harvested cotton rearwardly to an auger carried by support structure including an auger housing in which the auger is free unless restricted, to move vertically, the improvement residing in means permitting raising of the auger from the base of the auger housing comprising: journal means for and including a pair of journal supports at opposite ends of the auger; a lever at each of said ends supported on the support structure; and means connected to and shiftable with the respective lever and operatively connected to the respective journal supports for locking the auger in a single predetermined operational position with respect to and at the base of said housing.

2. The structure as set forth in claim 1 in which the auger housing has ends permitting free vertical movement of the ends of the auger, the auger has a central shaft portion extending outwardly of the respective ends, and the means connected to and shiftable with the respective lever is a link pivoted to the lever and journal support and shiftable into an over-center position with respect to the pivotal connection of the lever to the support structure when the auger is in the position at the base of the housing.

3. The structure as set forth in claim 1 in which the means connected to and shiftable with the respective lever is a cam bearable against the journal support and effective to hold the respective end of the auger in its position at the base of the housing.

4. A cotton harvester comprising: cotton harvesting mechanism for harvesting cotton from plants across a transverse expanse and feeding harvested cotton rearwardly; a transverse auger structure carried by support structure in materialreceiving relation to the harvesting mechanism and including an auger and auger housing having opposite ends and in which the auger is free, unless restricted, to move vertically; journal means including a pair of journal supports at opposite ends of the auger; a lever at each of said ends supported on the support structure; and means connected to and shiftable with the respective lever and operatively connected to the respective journal supports for locking the auger in a single predetermined operational position with respect to and adjacent the base of said housing.

5. A harvester comprising: harvesting mechanism for harvesting plants across a transverse expanse and feeding harvested material rearwardly; a transverse auger structure carried by support structure in material-receiving relation to the harvesting mechanism and including an auger and auger housing in which the auger is free, unless restricted, to move vertically; journal means including a pair of journal supports at opposite ends of the auger; a lever supported on the support structure; and means connected to and shiftable with the lever and operatively connected to at least one of the respective journal supports for locking the auger in a position adjacent the base of said housing.

6. The structure as set forth in claim 5 in which the lever is pivotally supported on the support structure for vertical movement above the journal support and the said means connected to and shiftable with the controllable member is linkage extending between the lever and journal support and said linkage moves into an over-center locking position upon the auger being shifted into its position adjacent the base.

7. The structure as set forth in claim 5 in which the lever is pivotally supported on the support structure for vertical movement above the journal support and the said means connected to and shiftable with the controllable member is a cam above and bearable against the journal support for holding the auger in its position adjacent the base.

8. The structure as set forth in claim 5 in which the housing includes opposite vertical end plates, the auger includes a central shaft portion having opposite ends extending through the end plates through openings permitting vertical movement of the auger away from its position adjacent the base of said housing, and further characterized by guide means on the respective end plates engageable with the respective journal supports for guiding the latter in a vertical path.

9. The structure as set forth in claim 8 in which the journal supports include vertical plates disposed alongside the respective end plates and having vertical slots therein, and the guide means are lugs fixed to the end plates and extending through the slots.

10. The structure as set forth in claim 8 in which the journal supports include vertical plates disposed alongside the respective end plates and the guide means are vertically extending tracks fixed to the end plates and engageable with the edges of the vertical plates for guiding the latter vertically.

11. The structure as set forth in claim 8 in which the journal supports include vertical plates disposed alongside the end plates and the guide means have vertical portions contacting the transverse outer sides of the vertical plates for restricting axial movement of the plates.

12. The structure as set forth in claim 11 characterized by the lever being pivotally mounted for vertical movement about a pivot on the supporting structure and having a link extending between pivot points on the lever and plate, and further characterized by said pivot and said pivot point being in an over-center locked position upon the auger being in its position adjacent the base of the housing.

* * * * *